United States Patent
Lee

(10) Patent No.: US 8,843,793 B2
(45) Date of Patent: Sep. 23, 2014

(54) SCHEDULING FOR ENHANCING COMMUNICATION PERFORMANCE

(75) Inventor: Hyoung-Gon Lee, Seoul (KR)

(73) Assignee: Empire Technology Development LLC, Wilmington, DE (US)

(*) Notice: Subject to any disclaimer, the term of this patent is extended or adjusted under 35 U.S.C. 154(b) by 220 days.

(21) Appl. No.: 13/503,827

(22) PCT Filed: Nov. 28, 2011

(86) PCT No.: PCT/US2011/062242
§ 371 (c)(1),
(2), (4) Date: Apr. 24, 2012

(87) PCT Pub. No.: WO2013/081577
PCT Pub. Date: Jun. 6, 2013

(65) Prior Publication Data
US 2013/0139009 A1    May 30, 2013

(51) Int. Cl.
*G06F 11/00* (2006.01)
(52) U.S. Cl.
USPC .......................................... 714/708; 714/707
(58) Field of Classification Search
USPC ................... 455/423; 375/296; 370/437, 329; 709/224; 714/748, 704, 708, 707
See application file for complete search history.

(56) References Cited

U.S. PATENT DOCUMENTS

| 6,539,205 | B1 | 3/2003 | Wan et al. |
| 7,333,805 | B2* | 2/2008 | Oestreich ...................... 455/423 |
| 7,486,693 | B2* | 2/2009 | Walter et al. .................. 370/437 |
| 7,765,451 | B2 | 7/2010 | Yomo et al. |
| 7,778,214 | B2 | 8/2010 | Sumioka et al. |
| 7,890,049 | B2 | 2/2011 | Chang et al. |
| 8,326,971 | B2* | 12/2012 | Dickerson et al. ............ 709/224 |
| 2004/0233869 | A1* | 11/2004 | Uchida ......................... 370/329 |
| 2006/0029156 | A1* | 2/2006 | Hirata ........................... 375/296 |
| 2008/0209299 | A1 | 8/2008 | Chang et al. |
| 2011/0182301 | A1 | 7/2011 | Ericson et al. |
| 2013/0077589 | A1* | 3/2013 | Qu et al. ....................... 370/329 |

OTHER PUBLICATIONS

Australian Patent Office, International Search Report and Written Opinion of the International Searching Authority for PCT/US2011/062242, mailed on Feb. 21, 2012.

* cited by examiner

Primary Examiner — David Ton
(74) Attorney, Agent, or Firm — Brundidge & Stanger, P.C.

(57) ABSTRACT

Technologies are generally described for enhancing communication performance. In some examples, a scheduling system may include an error detection unit configured to detect existence of an error in data received from a telecommunication device, an error frequency calculation unit configured to calculate an error frequency based at least in part on the error detected by the error detection unit, and a mode decision unit configured to decide a scheduling mode for the telecommunication device based at least in part on the error frequency calculated by the error frequency calculation unit.

20 Claims, 5 Drawing Sheets

SCHEDULING FOR ENHANCING COMMUNICATION PERFORMANCE

BACKGROUND

In mobile telecommunications, sometimes signals transmitted between a base station and a mobile device are relatively weak when the mobile device is located on or near an edge of a cell defined by the base station. Such weak signal strength causes high possibilities of errors, and sometimes retransmission is required due to such errors. In such cases, the overall performance (i.e., throughput) deteriorates.

SUMMARY

In an example, a scheduling system may include an error detection unit configured to detect existence of an error in data received from a telecommunication device, an error frequency calculation unit configured to calculate an error frequency based at least in part on the error detected by the error detection unit, and a mode decision unit configured to decide a scheduling mode for the telecommunication device based at least in part on the error frequency calculated by the error frequency calculation unit.

In an example, a method performed under the control of a scheduling system may include receiving data from a telecommunication device, making a determination on whether the received data has an error, calculating an error frequency based at least in part on the determination, comparing the error frequency with a predetermined value, and if the error frequency is higher than the predetermined value, transmitting a first mode change message to the telecommunication device.

In an example, a computer-readable storage medium may store computer-executable instructions that, in response to execution, cause a base station to perform operations, including making a determination on whether data received from a telecommunication device has an error, calculating an error frequency based at least in part on the determination, comparing the error frequency with a predetermined value, and if the error frequency is higher than the predetermined value, broadcasting a mode change message within a cell.

In an example, a method performed under the control of a telecommunication device may include transmitting signals to a base station once in a frame, receiving a mode change message from the base station, transmitting a first signal to the base station for a first time slot, and transmitting a second signal to the base station for a second time slot. The first signal and the second signal may be identical to each other, and the first time slot and the second time slot may be within a single frame.

In an example, a method performed under the control of a telecommunication device may include receiving a mode change message from a base station, receiving a signal from another telecommunication device for a first time slot, and transmitting the received signal to the base station for a second time slot. The first time slot and the second time slot may be within a single frame.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
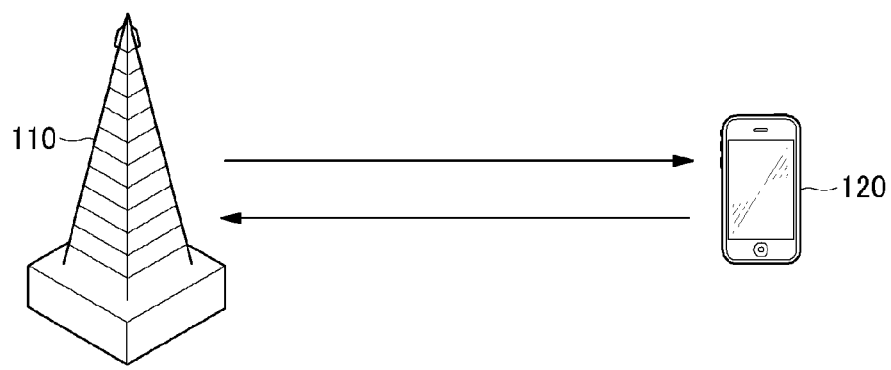
FIG. 1 schematically shows an illustrative example of an environment where an example scheduling scheme is performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a scheduling scheme for enhancing communication performance.

Briefly stated, technologies are generally described for providing a scheduling scheme between a base station and a mobile telecommunication device located in a cell defined by the base station. In some examples, the mobile telecommunication device may be located on or near an edge of the cell, so that the data received by the base station from the mobile telecommunication device may have an error. In cases where the frequency of errors is higher than a predetermined value, the base station may change its uplink scheduling mode for the corresponding mobile telecommunication device from "normal mode" where the mobile telecommunication device transmits data to the base station once in a single frame, to "in-frame retransmission mode" where the mobile telecommunication device transmits the same data at least twice, e.g., at least for a first time slot and a second time slot, in a single frame. In some examples, the base station may transmit a mode change message to the mobile telecommunication device, then the mobile telecommunication device may transmit the same data twice, for the first time slot and the second time slot, in a single frame. In such cases, the base station may receive same data from the mobile telecommunication device twice at the first time slot and at the second time slot. In some examples, a relay device may receive the data from the mobile telecommunication device for the first time slot, and relay or transmit the received data to the base station for the second time slot. In such cases, at the second time slot, the base station may receive same data from the mobile telecommunication device and the relay device. Thus, the base station may get effects of spatial diversity and time diversity that may enhance its reception performance.

FIG. 1 schematically shows an illustrative example of an environment where an example scheduling scheme is performed in accordance with at least some embodiments described herein. As depicted, a base station 110 may communicate with, e.g., send signals to or receive signals from, a telecommunication device 120. Examples of telecommunication device 120 may include, but are not limited to, a mobile phone, a smart phone, a personal digital assistant (PDA), a tablet computer, a laptop computer, or other similar devices having communication capability. Although FIG. 1 illustrates that one telecommunication device communicates with base station 110, one skilled in the art will appreciate that any number of telecommunication devices can communicate with base station 110.

In some embodiments, base station 110 and telecommunication device 120 may communicate with each other on frame basis. Each downlink frame from base station 110 to telecommunication device 120 may include information thereon. By way of example, but not limitation, each downlink frame may include the information in the front part thereof. By way of example, but not limitation, the information may include a "signaling and control channel." By way of example, but not limitation, the signaling and control channel may carry at least one of positive/negative acknowledgements (ACK/NACK) message, control data such as mode change message, and uplink/downlink assignment mapping data, etc. By way of example, but not limitation, the information may be broadcasted.

In some embodiments, base station 110 may determine whether data in an uplink frame from telecommunication device 120 has an error. If the data has no error, base station 110 may transmit an ACK message in the signaling and control channel, while if the uplink frame has an error, base station 110 may transmit a NACK message in the signaling and control channel. When telecommunication device 120 receives the NACK message, telecommunication device 120 may retransmit the same data in the next scheduled frame.

In some embodiments, base station 110 may calculate an error frequency and decide a scheduling mode for telecommunication device 120 based at least in part on the calculated error frequency. In some embodiments, base station 110 may compare the error frequency with a predetermined value, and generate a mode change message if the error frequency is higher than the predetermined value. In some embodiments, the mode change message may instruct telecommunication device 120 to send to base station 110 same data at least twice for a frame. By way of example, but not limitation, the mode change message may instruct telecommunication device 120 to send to base station 110 same data twice, e.g., for a first time slot and a second time slot, in a single frame.

In some embodiments, when telecommunication device 120 receives the mode change message from base station 110, telecommunication device 120 may change its scheduling mode to in-frame retransmission mode. In the in-frame retransmission mode, telecommunication device 120 may transmit the same data at least twice for a frame. By way of example, but not limitation, telecommunication device 120 may transmit the same data twice, e.g., for the first time slot and the second time slot, in a single frame. That is, telecommunication device 120 may transmit certain data for the first time slot, and retransmit the same data for the second time slot.

In some embodiments, when base station 110 receives the data successfully, base station 110 may transmit an ACK message to telecommunication device 120. In such cases, telecommunication device 120 may transmit next data to base station 110.

In some embodiments, in cases where base station 110 determines that the data transmission for the first time slot alone can be received without errors, base station 110 may change its scheduling mode from in-frame retransmission mode to normal mode, where telecommunication device 120 may transmit data to base station 110 once in a single frame.

Figure 2:
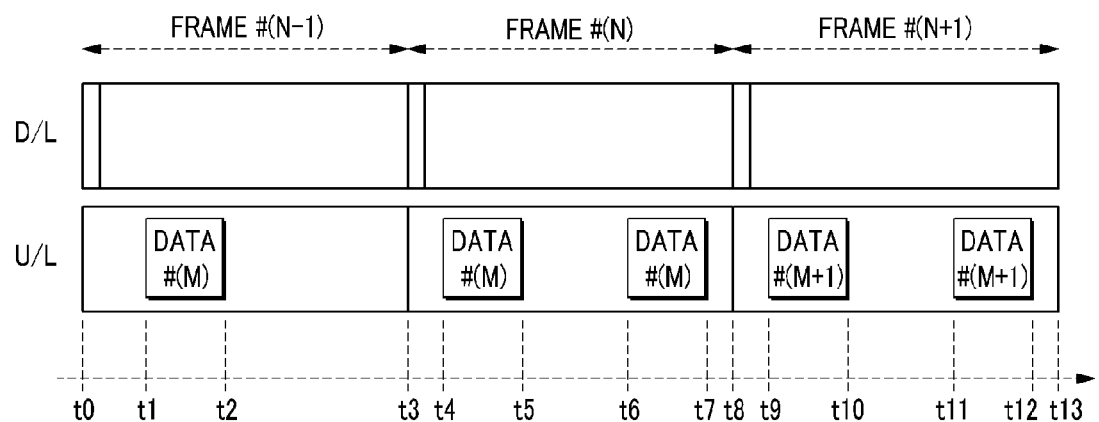
FIG. 2 shows an illustrative example of frame exchange sequence under an example scheduling scheme.

FIG. 2 shows an illustrative example of frame exchange sequence under an example scheduling scheme in accordance with at least some embodiments described herein. As depicted, in some embodiments, uplink frames from a telecommunication device to a base station and downlink frames from the base station to the telecommunication device may be synchronized with each other. Although FIG. 2 illustrates that the uplink frames and the downlink frames are synchronized with each other, one skilled in the art will appreciate that the uplink frames and the downlink frames may not be synchronized with each other in some other embodiments.

By way of example, but not limitation, each downlink frame may include a signaling and control channel in the front part thereof. By way of example, but not limitation, the signaling and control channel may carry at least one of positive/negative acknowledgements (ACK/NACK) message, control data such as mode change message, and uplink/downlink assignment mapping data, etc.

In the example embodiments described with reference to FIG. 2, it is assumed that at frame #(N−2) (not shown), the telecommunication device sends data #(M) to the base station, but the base station detects an error in the data received from the telecommunication device. Then, at frame #(N−1), the base station may transmit to the telecommunication device a NACK message in the signaling and control channel at time $t_0$.

In some embodiments, upon receiving the NACK message from the base station, the telecommunication device may retransmit data #(M) for a predetermined time slot, e.g., time $t_1$ to $t_2$. In some embodiments, the base station may make a determination on whether the data received at frame #(N−1) has an error. Then, the base station may calculate an error frequency, and compare the error frequency with a predetermined value. In cases where the error frequency is higher than the predetermined value, the base station may decide to change its scheduling mode to in-frame retransmission mode, and assign two time slots in the next uplink frame for the telecommunication device.

Next, at frame #(N), the base station may transmit to the telecommunication device a mode change message together with a NACK message in the signaling and control channel at time $t_3$. In some embodiments, the base station may also transmit to the telecommunication device information on the two time slots, e.g., starting points of the times slots, duration of the time slots, etc. In some embodiments, upon receiving the mode change message from the base station, the telecommunication device may retransmit data #(M) for the two time slots, e.g., time $t_4$ to $t_5$ and time $t_6$ to $t_7$, set by the base station. Then, the base station may make a determination on whether the data received at frame #(N) has an error. In cases where the base station receives the data successfully at frame #(N), the base station, at frame #(N+1), may transmit to the telecommunication device an ACK message in the signaling and control channel at time $t_8$. Then, the telecommunication device may transmit the next data, e.g., data #(M+1), for the two time slots, e.g., time $t_9$ to $t_{10}$ and time $t_{11}$ to $t_{12}$.

As such, in cases where the base station receives the same data twice in a single frame, the base station may combine the data received at two different time slots, enhancing reception performance by time diversity.

Figure 3:
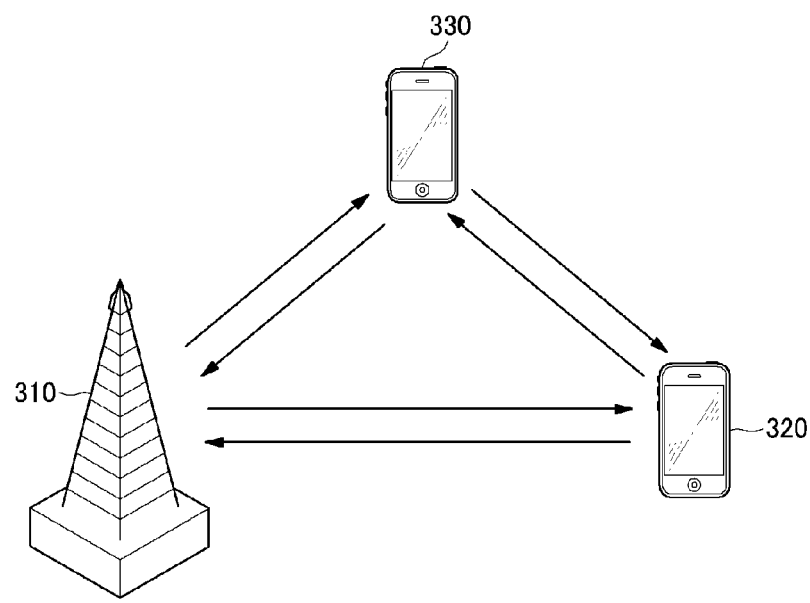
FIG. 3 schematically shows another illustrative example of an environment where an example scheduling scheme is performed.

FIG. 3 schematically shows another illustrative example of an environment where an example scheduling scheme is performed in accordance with at least some embodiments described herein. As depicted, a base station 310 may communicate with, e.g., send signals to or receive signals from, a telecommunication device 320. Base station 310 may also communicate with, e.g., send signals to or receive signals from, another telecommunication device, i.e., a relay device 330. Telecommunication device 320 may also communicate with, e.g., send signals to or receive signals from, relay device 330. Examples of telecommunication device 320 and relay device 330 may include, but are not limited to, a mobile phone, a smart phone, a personal digital assistant (PDA), a tablet computer, a laptop computer, or other similar devices having communication capability. Although FIG. 3 illustrates that one telecommunication device and one relay device communicate with base station 310, one skilled in the art will appreciate that any number of telecommunication devices and any number of relay devices can communicate with base station 310. Further, although FIG. 3 illustrates that relay device 330 is separate from telecommunication device 320, one skilled in the art will appreciate that relay device 330 can be a part of telecommunication device 320 alternatively.

In some embodiments, base station 310, telecommunication device 320 and relay device 330 may communicate with one another on frame basis. Each downlink frame from base station 310 may include information thereon. By way of example, but not limitation, each downlink frame may include the information in the front part thereof. By way of example, but not limitation, the information may include a signaling and control channel. By way of example, but not limitation, the signaling and control channel may carry at least one of positive/negative acknowledgements (ACK/NACK) message, control data such as mode change message, and uplink/downlink assignment mapping data, etc. By way of example, but not limitation, the information may be broadcasted.

In some embodiments, base station 310 may determine whether data in an uplink frame from telecommunication device 320 has an error. If the data has no error, base station 310 may transmit an ACK message in the signaling and control channel, while if the uplink frame has an error, base station 310 may transmit a NACK message in the signaling and control channel. When telecommunication device 320 receives the NACK message, telecommunication device 320 may retransmit the same data in the next scheduled frame.

In some embodiments, base station 310 may calculate an error frequency, and decide a scheduling mode for telecommunication device 320 based at least in part on the calculated error frequency. In some embodiments, base station 310 may compare the error frequency with a predetermined value, and generate a mode change message if the error frequency is higher than the predetermined value. In some embodiments, the mode change message may instruct telecommunication device 320 to send to base station 310 same data at least twice for a frame. By way of example, but not limitation, the mode change message may instruct telecommunication device 320 to send to base station 310 same data twice, e.g., for a first time slot and a second time slot, in a single frame.

In some embodiments, when telecommunication device 320 receives the mode change message from base station 310, telecommunication device 320 may change its scheduling mode to in-frame retransmission mode. In in-frame retransmission mode, telecommunication device 320 may transmit the same data at least twice for a frame. By way of example, but not limitation, telecommunication device 320 may transmit the same data twice, e.g., for the first time slot and the second time slot, in a single frame. That is, telecommunication device 320 may transmit certain data for the first time slot, and retransmit the same data for the second time slot.

In some embodiments, base station 310 may designate relay device 330 for telecommunication device 320 to assist communications between base station 310 and telecommunication device 320. In some embodiments, base station 310 may designate relay device 330 for telecommunication device 320 based at least in part on the locations of telecommunication device 320 and relay device 330. In some embodiments, base station 310 may suggest or recommend a group of available relay devices for telecommunication device 320 at least in part on the locations of telecommunication device 320 and the relay devices.

In some embodiments, relay device 330 may receive the mode change message from base station 310. In such cases, relay device 330 may receive the data which has been transmitted for the first time slot by telecommunication device 320. In some embodiments, relay device 330 may determine whether the received data has an error or not. If the received data has an error, the data may be disregarded or discarded, while the received data has no error, relay device 330 may transmit or relay the received data to base station 310. In some embodiments, relay device 330 may transmit or relay the received data to base station 310 for the second time slot.

In some embodiments, when base station 310 receives the data successfully, base station 310 may transmit an ACK message to telecommunication device 320. In such cases, telecommunication device 320 may transmit next data to base station 310. In some embodiments, in cases where base station 310 determines that the data transmission for the first time slot alone can be received without errors, base station 310 may change its scheduling mode from in-frame retransmission mode to normal mode, where telecommunication device 320 may transmit data to base station 310 once in a single frame.

Figure 4:
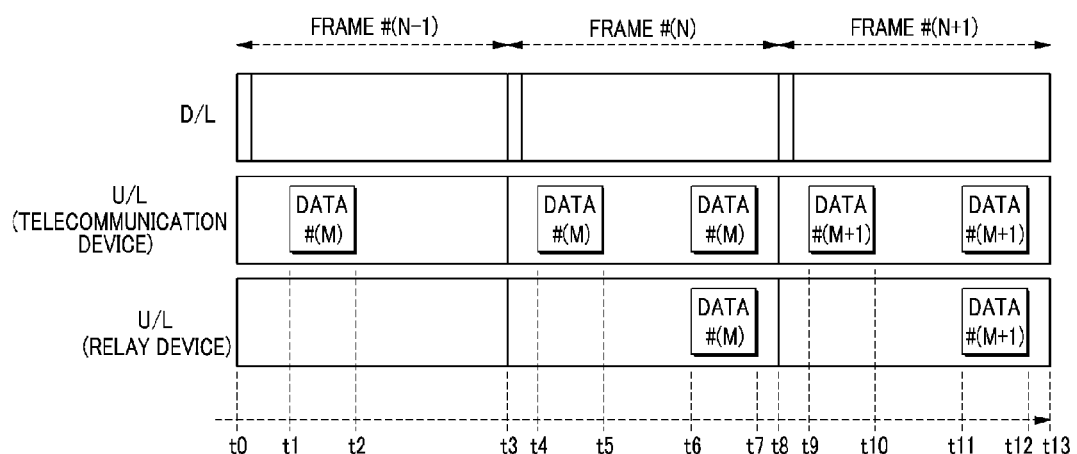
FIG. 4 shows another illustrative example of frame exchange sequence under an example scheduling scheme.

FIG. 4 shows another illustrative example of frame exchange sequence under an example scheduling scheme performed in accordance with at least some embodiments described herein. As depicted, in some embodiments, downlink frames from a base station to a telecommunication device, uplink frames from the telecommunication device to the base station, and uplink frames from a relay device to the base station may be synchronized with one another. Although FIG. 4 illustrates that the two uplink frames (i.e., the uplink frames from the telecommunication device to the base station and the uplink frames from the relay device to the base station) and the downlink frames from the base station to the telecommunication device are synchronized with each other, one skilled in the art will appreciate that the two uplink frames and the downlink frames may not be synchronized with each other in some other embodiments.

By way of example, but not limitation, each downlink frame may include a signaling and control channel in the front part thereof. By way of example, but not limitation, the signaling and control channel may carry at least one of positive/ negative acknowledgements (ACK/NACK) message, control data such as mode change message, and uplink/downlink assignment mapping data, etc.

In the example embodiments described with reference to FIG. 4, it is assumed that at frame #(N−2) (not shown), the telecommunication device sends data #(M) to the base station, but the base station detects an error in the data received from the telecommunication device. Then, at frame #(N−1), the base station may transmit to the telecommunication device a NACK message in the signaling and control channel at time $t_0$.

In some embodiments, upon receiving the NACK message from the base station, the telecommunication device may retransmit data #(M) for a predetermined time slot, e.g., time $t_1$ to $t_2$. In some embodiments, the base station may make a determination on whether the data received at frame #(N−1) has an error. Then, the base station may calculate an error frequency, and compare the error frequency with a predetermined value. In cases where the error frequency is higher than the predetermined value, the base station may decide to change its scheduling mode to in-frame retransmission mode, and assign two time slots, i.e. first and second time slots, in the next uplink frame for the telecommunication device.

Next, at frame #(N), the base station may transmit to the telecommunication device a mode change message together with a NACK message in the signaling and control channel at time $t_3$. In some embodiments, the base station may broadcast mode change message within a cell defined by the base station. In some embodiments, the base station may also broadcast or transmit to the telecommunication device information on the two time slots, e.g., starting points of the times slots, duration of the time slots, etc. In some embodiments, upon receiving the mode change message from the base station, the telecommunication device may retransmit data #(M) for the two time slots, e.g., time $t_4$ to $t_5$ and time $t_6$ to $t_7$, set by the base station. In some embodiments, upon receiving the mode change message from the base station, the relay device may receive the data, which has been transmitted by the telecommunication device for the first time slot (e.g., time $t_4$ to $t_5$), and relay or transmit the received data to the base station for the second time slot (e.g., time $t_6$ to $t_7$). In some embodiments, the relay device may relay or transmit the received data to the base station in cases where it determines that the received data has no error.

Then, the base station may make a determination on whether the data received at frame #(N) has an error. In cases where the base station receives the data successfully at frame #(N), the base station, at frame #(N+1), may transmit to the telecommunication device an ACK message in the signaling and control channel at time $t_8$. Then, the telecommunication device may transmit the next data, e.g., data #(M+1), for the two time slots, e.g., time $t_9$ to $t_{10}$ and time $t_{11}$ to $t_{12}$. In some embodiments, the relay device may receive the data, which has been transmitted by the telecommunication device from time $t_9$ to $t_{10}$, and relay or transmit the received data to the base station from time $t_{11}$ to $t_{12}$. In some embodiments, the relay device may relay or transmit the received data to the base station in cases where it determines that the received data has no error.

As such, in cases where the base station receives the same data twice in a single frame, the base station may combine the data received at two different time slots, enhancing reception performance by time diversity. Further, in cases where the base station receives the same data from the relay device as well as the telecommunication device, the base station may combine the data received from two different locations, enhancing reception performance by spatial diversity.

Figure 5:
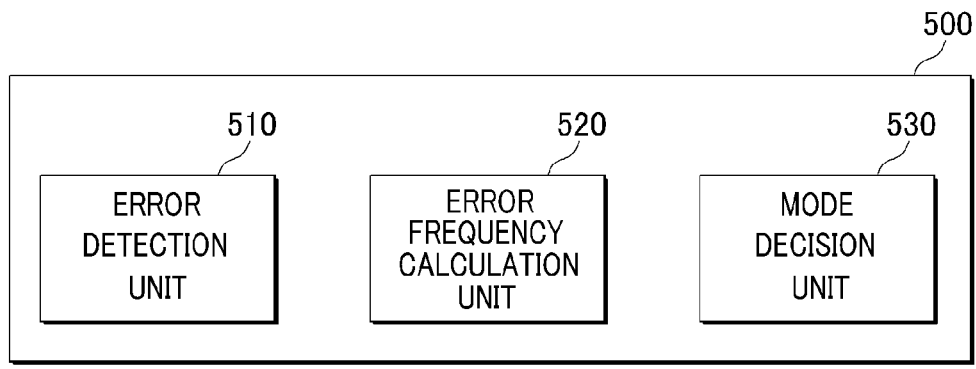
FIG. 5 shows a schematic block diagram of an illustrative example of a scheduling system.

FIG. 5 shows a schematic block diagram of an illustrative example of a scheduling system in accordance with at least some embodiments described herein. As depicted, a scheduling system 500 may include an error detection unit 510, an error frequency calculation unit 520 and a mode decision unit 530. Although illustrated as discrete components, various components may be divided into additional components, combined into fewer components, or eliminated while being contemplated within the scope of the disclosed subject matter.

Error detection unit 510 may be configured to detect existence of an error in data received from a telecommunication device. By way of example, but not limitation, error detection unit 510 may perform an error detection using an error correcting code (ECC) or forward error correction (FEC) code.

Error frequency calculation unit 520 may be configured to calculate an error frequency based at least in part on the error detected by error detection unit 510. In some embodiments, the error frequency may be associated with number of frames for which the received data has an error. By way of example, but not limitation, the error frequency may be associated with number of successive error frames or the proportion of error frames to total number of frames received during a predetermined period.

Mode decision unit 530 may be configured to decide a scheduling mode for the telecommunication device based at least in part on the error frequency calculated by error frequency calculation unit 520. By way of example, but not limitation, the scheduling mode may include normal mode where the mobile telecommunication device transmits data to the base station once in a single frame, and in-frame retransmission mode where the mobile telecommunication device transmits the same data at least twice in a single frame. In some embodiments, mode decision unit 530 may be further configured to generate a mode change message based at least in part on the decided scheduling mode.

In some embodiments, mode decision unit 530 may compare the error frequency calculated by error frequency calculation unit 520 with a predetermined value. By way of example, but not limitation, the predetermined value may be ten successive frames with error or, fifteen frames with error per twenty frames, etc.

In cases where the error frequency is higher than the predetermined value, mode decision unit 530 may decide the scheduling mode as in-frame retransmission mode, and generate a first mode change message, which may instruct the telecommunication device to send to a base station same data at least twice for a frame. In some embodiments, the mode change message may instruct the telecommunication device to send data to the base station and a relay device for a first time slot and a second time slot within a frame, and instruct the relay device to send the data received from the telecommunication device to the base station for the second time slot.

Figure 6:
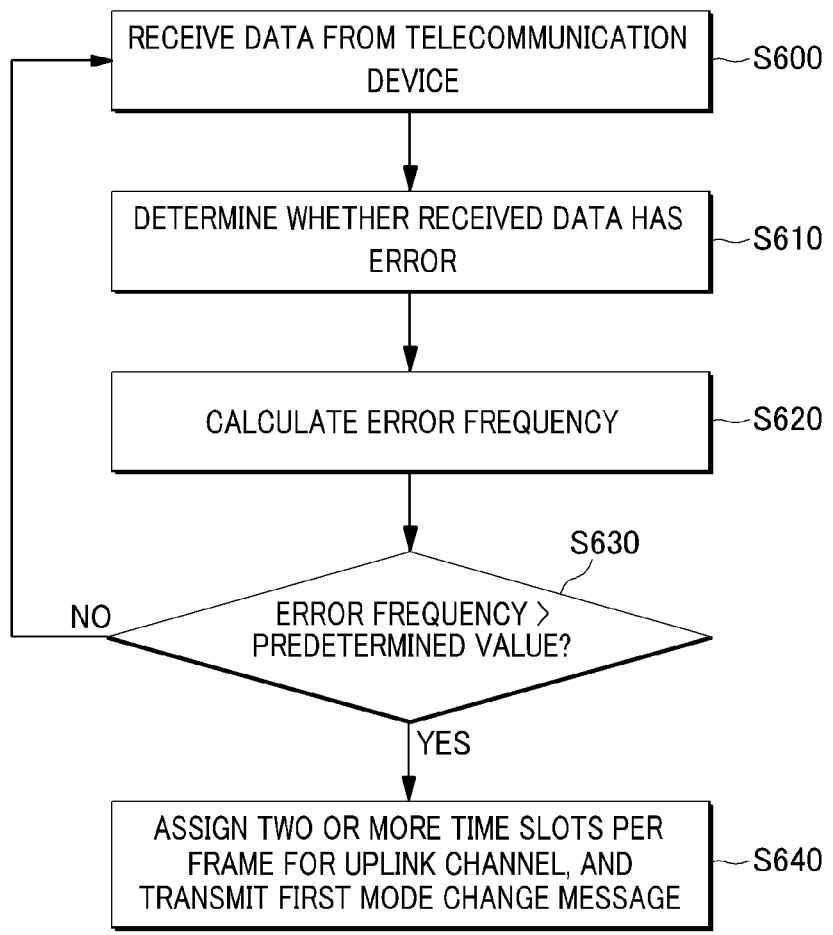
FIG. 6 shows an example flow diagram of a process for scheduling under the control of a scheduling system.

FIG. 6 shows an example flow diagram of a process for scheduling under the control of a scheduling system in accordance with at least some embodiments described herein. The process in FIG. 6 could be implemented using scheduling system 500 discussed above. An example process may include one or more operations, actions, or functions as illustrated by one or more blocks S600, S610, S620, S630 and/or S640. Although illustrated as discrete blocks, various blocks may be divided into additional blocks, combined into fewer blocks, or eliminated, and is not limited with these respects. Processing may begin at block S600.

At block S600, a scheduling system may receive data from a telecommunication device. By way of example, but not limitation, the scheduling system may be a part of a base station, or may provide a scheduling scheme or solution to the base station. Processing may continue from block S600 to block S610.

At block S610, the scheduling system may make a determination on whether the received data has an error. By way of example, but not limitation, the scheduling system may perform an error detection using an error correcting code (ECC) or forward error correction (FEC) code. Processing may continue from block S610 to block S620.

At block S620, the scheduling system may calculate an error frequency based at least in part on the determination. By way of example, but not limitation, the error frequency may be associated with number of successive frames with error or the proportion of frames with error to total number of frames received during a predetermined period. Processing may continue from block S620 to block S630.

At block S630, the scheduling system may compare the error frequency with a predetermined value. In cases where the error frequency is higher than the predetermined value, processing may continue from block S630 to block S640. Otherwise, processing may continue to block S600 again.

At block S640, the scheduling system may assign two or more time slots per frame for an uplink channel from the telecommunication device, and transmit a first mode change message to the telecommunication device. In some embodiments, the first mode change message may instruct the telecommunication device to send data at least twice for a frame. In such cases, the base station may receive the same data at least twice in a single frame.

In some embodiments, the first mode change message may instruct a relay device to relay data transmission from the telecommunication device. In such cases, the base station may receive first data from the telecommunication device substantially concurrently with receiving second data from the relay device.

Then, processing may continue to block S600 again. In cases where the scheduling system determines that the received data has no error and the data transmission for a first time slot alone can be received without errors, the scheduling system may transmit to the telecommunication device a second mode change message, which may instruct the telecommunication device to send data once per frame.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
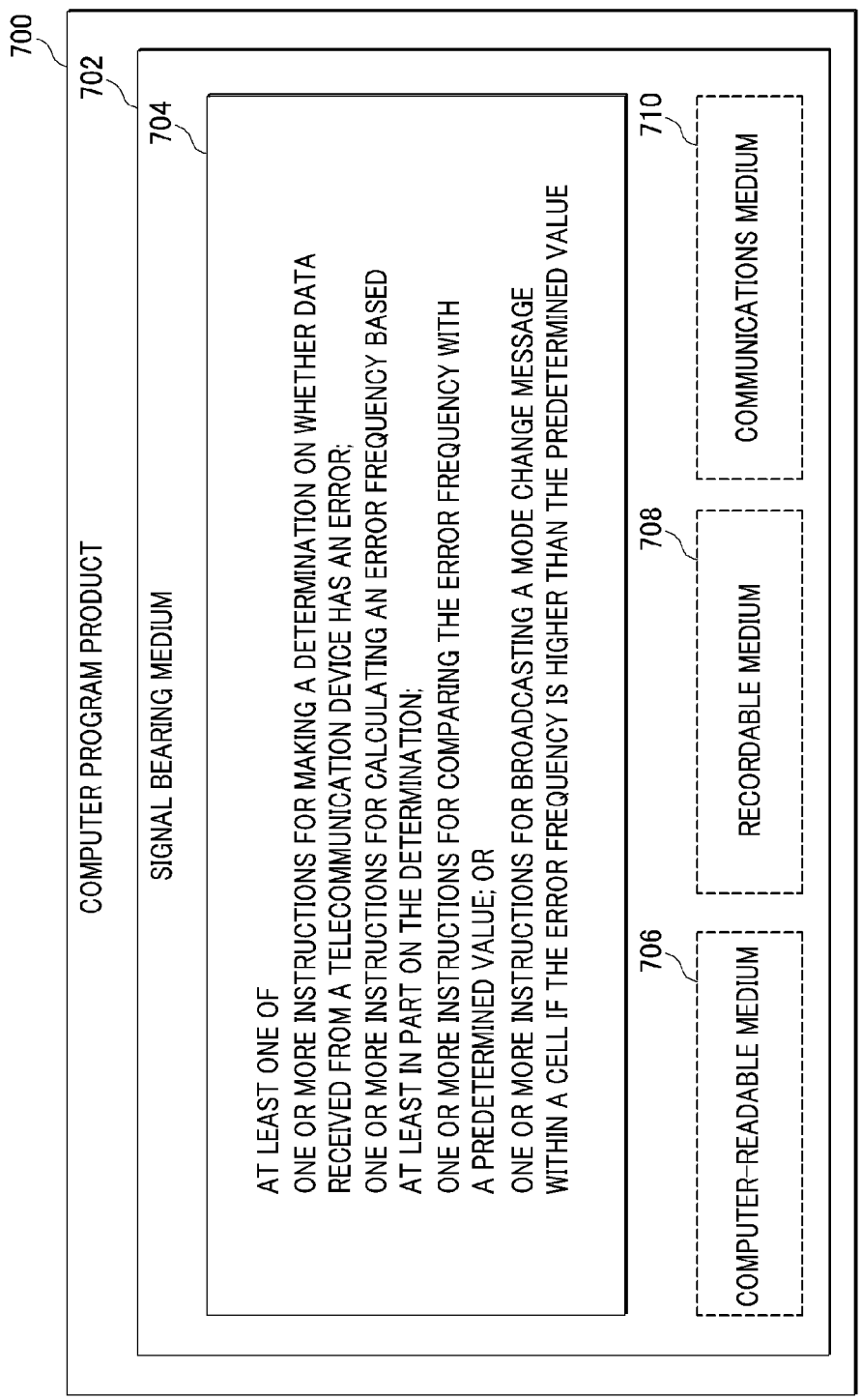
FIG. 7 illustrates computer program products that can be utilized to provide a scheduling scheme.

FIG. 7 illustrates computer program products that can be utilized to provide a scheduling scheme in accordance with at least some embodiments described herein. Program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include: one or more instructions for making a determination on whether data received from a telecommunication device has an error; one or more instructions for calculating an error frequency based at least in part on the determination; one or more instructions for comparing the error frequency with a predetermined value; or one or more instructions for broadcasting a mode change message within a cell if the error frequency is higher than the predetermined value. Thus, for example, referring to the system of FIG. 5, scheduling system 500 may undertake one or more of the blocks shown in FIG. 6 in response to instructions 704.

In some implementations, signal bearing medium 702 may encompass a computer-readable medium 706, such as, but not limited to, a hard disk drive, a compact disc (CD), a digital versatile disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of scheduling system 500 by an RF signal bearing medium 702, where the signal bearing medium 702 is conveyed by a wireless communications medium 710 (e.g., a wireless communications medium conforming with the IEEE 802.11 standard).

Figure 8:
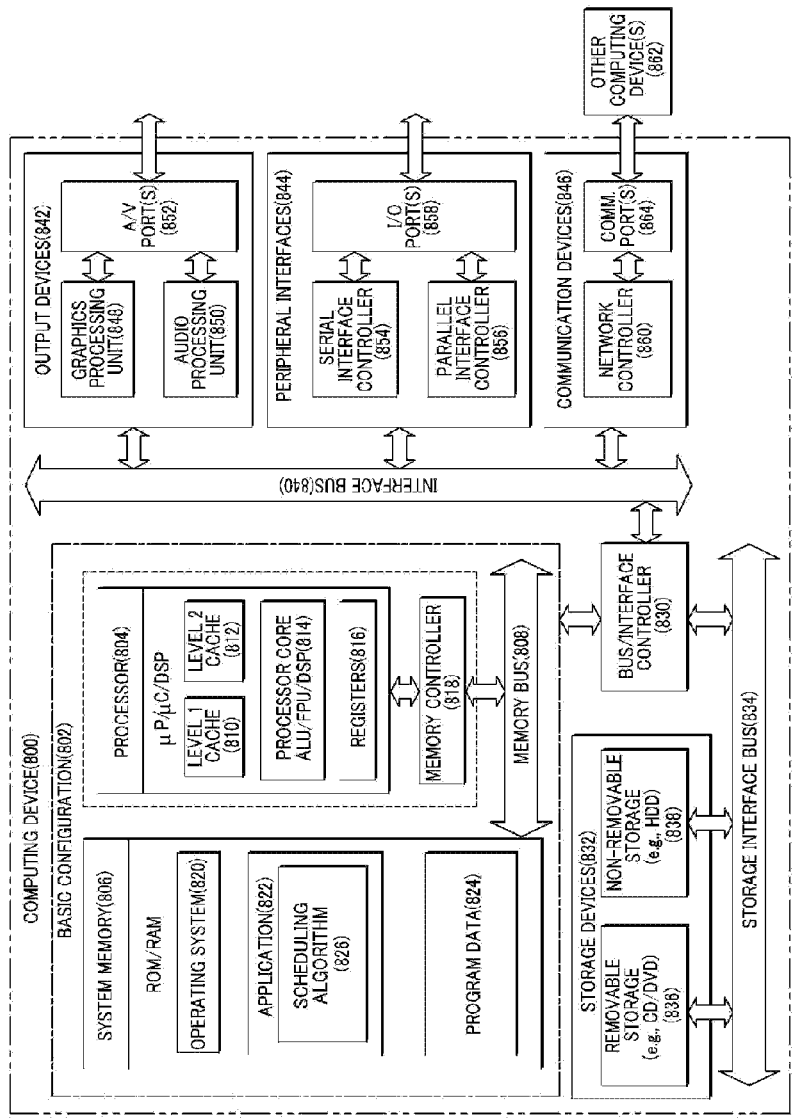
FIG. 8 is a block diagram illustrating an example computing device that can be utilized to provide a scheduling scheme, all arranged in accordance with at least some embodiments described herein.

FIG. 8 is a block diagram illustrating an example computing device that can be utilized to provide a scheduling scheme in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may typically be of any type including but not limited to a microprocessor (µP), a microcontroller (µC), a digital signal processor (DSP), or any combination thereof. Processor 804 may include one more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824.

Application 822 may include a scheduling algorithm 826 that is arranged to perform the functions as described herein including those described previously with respect to FIGS. 1-7. Program data 824 may include any data that may be useful for providing a scheduling scheme as is described herein. In some embodiments, application 822 may be arranged to operate with program data 824 on operating system 820 such that a scheduling scheme may be provided. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. For example, although the embodiments described in this application illustrates an example frame exchange sequence assuming that a base station assigns to a telecommunication device one time slot for one frame in normal mode, one skilled in the art will appreciate that the base station may also assign to the telecommunication device one time slot for two or more frames. In such cases, the mobile telecommunication device may transmit data to the base station once for a predetermined number of frames in "normal mode," while transmit the same data at least twice, e.g., at least for a first time slot and a second time slot, for the predetermined number of frames in "retransmission mode." Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A scheduling system, comprising:
an error detection unit configured to detect existence of an error in data received from a telecommunication device;
an error frequency calculation unit configured to calculate an error frequency based at least in part on the error detected by the error detection unit; and
a mode decision unit configured to:
decide a scheduling mode for the telecommunication device based at least in part on the error frequency calculated by the error frequency calculation unit;
compare the error frequency calculated by the error frequency calculation unit with a predetermined value; and
generate a mode change message if the error frequency is higher than the predetermined value.

2. The scheduling system of claim 1, wherein the mode decision unit is further configured to generate the mode change message based at least in part on the decided scheduling mode.

3. The scheduling system of claim 1, wherein the mode change message instructs the telecommunication device to send to a base station same data at least twice for a frame.

4. The scheduling system of claim 1, wherein the mode change message instructs the telecommunication device to send data to a relay device.

5. The scheduling system of claim 1, wherein the mode change message instructs the telecommunication device to send data to a base station and a relay device for a first time slot and a second time slot within a frame, and instructs the relay device to send the data received from the telecommunication device to the base station for the second time slot.

6. A method performed under the control of a scheduling system, comprising:
receiving data from a telecommunication device;
making a determination on whether the received data has an error;
calculating an error frequency based at least in part on the determination;
comparing the error frequency with a predetermined value; and
if the error frequency is higher than the predetermined value, transmitting a first mode change message to the telecommunication device.

7. The method of claim 6, wherein the first mode change message instructs the telecommunication device to send data at least twice for a frame.

8. The method of claim 6, further comprising:
if the error frequency is higher than the predetermined value, assigning two or more time slots per frame for an uplink channel from the telecommunication device.

9. The method of claim 6, further comprising:
if the error frequency is higher than the predetermined value, receiving data from the telecommunication device for a first time slot and a second time slot within a frame.

10. The method of claim 6, further comprising:
if the received data has no error, transmitting a second mode change message to the telecommunication device, wherein the second mode change message instructs the telecommunication device to send data once per frame.

11. The method of claim 6, wherein the error frequency is associated with number of frames for which the received data has an error.

12. The method of claim 6, further comprising:
if the error frequency is higher than the predetermined value, transmitting the first mode change message to a relay device.

13. The method of claim 12, further comprising:
receiving first data from the telecommunication device substantially concurrently with receiving second data from the relay device.

14. A computer-readable storage medium having stored thereon computer-executable instructions that, in response to execution, cause a base station to perform operations, comprising:
making a determination on whether data received from a telecommunication device has an error;
calculating an error frequency based at least in part on the determination;
comparing the error frequency with a predetermined value; and if the error frequency is higher than the predetermined value, broadcasting a mode change message within a cell.

15. The computer-readable storage medium of claim 14, wherein the operations further comprising:
selecting at least one relay device within the cell to support communications between the base station and the telecommunication device.

16. The computer-readable storage medium of claim 14, wherein the operations further comprising:
if the error frequency is higher than the predetermined value, assigning two or more time slots per frame for an uplink channel from the telecommunication device.

17. A method performed under the control of a telecommunication device, comprising:
transmitting signals to a base station once in a frame;
receiving a mode change message from the base station;
transmitting a first signal to the base station for a first time slot; and
transmitting a second signal to the base station for a second time slot,
wherein the first signal and the second signal are identical to each other, and the first time slot and the second time slot are within a single frame.

18. A method performed under the control of a telecommunication device, comprising:
receiving a mode change message from a base station;
receiving a signal from another telecommunication device for a first time slot; and
transmitting the received signal to the base station for a second time slot,
wherein the first time slot and the second time slot are within a single frame.

19. The method of claim 18, further comprising:
determining whether the received signal has an error.

20. The method of claim 19, wherein the transmitting comprises transmitting the received signal if the received signal has no error.

* * * * *